No. 816,845. PATENTED APR. 3, 1906.
L. E. CAPPS.
OPTICAL TOOL.
APPLICATION FILED MAY 16, 1905.

WITNESSES
F. Dudley Mroe.
Stephen A. Brooke

INVENTOR
Lewis E. Capps.
BY
Frank E. Adams
ATTORNEY ic
UNITED STATES PATENT OFFICE.

LEWIS E. CAPPS, OF SEATTLE, WASHINGTON.

OPTICAL TOOL.

No. 816,845.　　　　Specification of Letters Patent.　　　　Patented April 3, 1906.

Application filed May 16, 1905. Serial No. 260,719.

*To all whom it may concern:*

Be it known that I, LEWIS E. CAPPS, a citizen of the United States of America, and a resident of the city of Seattle, in the county of King and State of Washington, have invented certain new and useful Improvements in Optical Tools, of which the following is a specification.

My invention relates to certain new and useful improvements in optical tools; and the primary object thereof is to provide means for adjusting the lens-clips of eyeglasses so that they will be properly spaced apart to receive a lens of predetermined thickness.

With the above and other objects in view, as described in the following, the invention consists in the parts, arrangement, and combination of parts hereinafter set forth, and succinctly pointed out in the appended claims.

Figure 1:
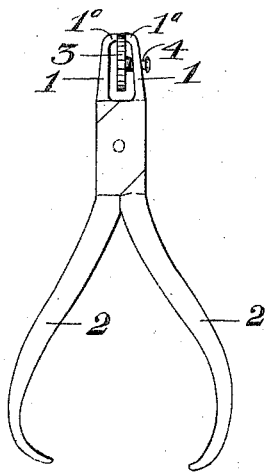
Figure 5:
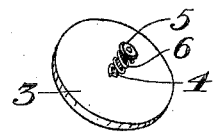
Figure 6:
Figure 2:
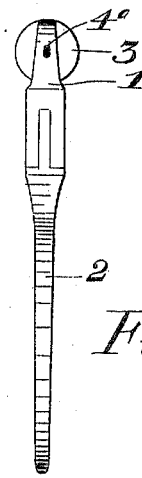
Figure 3:
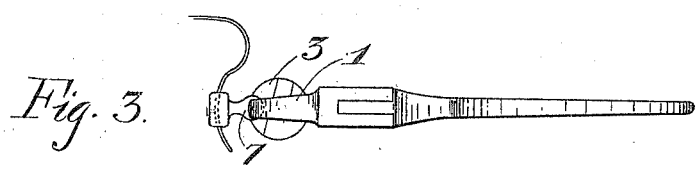
Figure 4:
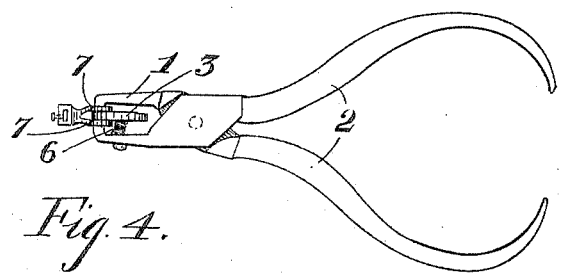

In the accompanying drawings, forming a part of this specification, and wherein like numerals of reference indicate like parts throughout the several views, Figure 1 is a view in side elevation of the present invention. Fig. 2 is an edge view thereof, the supporting-pin of the former being shown in section. Fig. 3 is a fragmentary view showing the application of my improvement. Fig. 4 is a top plan view thereof, the bridge of the eyeglasses being removed; and Figs. 5 and 6 are detail views of the former, taken from opposite sides thereof.

In carrying out my invention I provide a pair of oppositely-disposed compressors 1, which are in the form of jaws, pivoted together at their inner ends and being operated toward and from each other by handles 2. These jaws are provided at their outer ends with inwardly-projecting lips 1$^a$, for a purpose set forth hereinafter.

Reference-numeral 3 indicates a former or block, against which the side parts of the lens-clips are compressed, the same being rigidly connected to a pin 4, which projects through a slot 4$^a$ in one of the compressors and has a washer 5 riveted or otherwise secured to its outer end, and a spring, as 6, encircles pin 4 and bears against the former 3 and the inner face of the adjacent jaw, thereby normally holding the said former at the inner limit of its movement and spaced from the adjacent lip 1$^a$.

The former is graduated or has its thickness varied at different points, (see Fig. 6,) so that the degree of compression of the lens-clips can be regulated in conformity with the thickness of the lens which is to be fitted therein. Hence in operation the side portions or arms 7 of the lens-clip are caused to straddle the former 3, as shown in Fig. 4, said former having been rotated to bring that portion of the desired thickness in position to be embraced by said arms 7, and the handles are then moved toward one another, thereby causing the lips 1$^a$ to firmly compress the said arms 7 against the sides of the former, which by reason of its pin 4 being mounted in the slot 4$^a$ will adjust itself to a true central position relatively to the compressors, and thereby prevent any untrue bending of said arms.

In the foregoing I have described a construction which will carry out the various functions assigned thereto. I am aware, however, that changes in the construction can readily be made therein without departing from the spirit of my invention, and I therefore reserve the right to make such alterations and changes as fall within the scope of the appended claims.

Having thus fully described my invention, what I claim as new, and desire to secure by Letters Patent, is—

1. A device of the type set forth comprising a plurality of compressors, means for operating the same, a former, and a support for said former mounted in one of said compressors and being free to be moved independently thereof.

2. A device of the type set forth comprising opposite compressors, means to move the same toward and from each other, and a former yieldingly supported between said compressors.

3. A device of the type set forth comprising a plurality of compressors, means for operating the same toward and from each other, and a former arranged between said compressors and being movably supported in one thereof.

4. A device of the type set forth comprising a plurality of compressors, means for operating the same, a former arranged between said compressors, and a support to which said former is secured slidably mounted in one of said compressors.

5. A device of the type set forth comprising opposite compressors, means for operating the same, a former arranged between said compressors, a support for said former slidably mounted in one of said compressors, and resilient means for normally holding said former from the last-named compressor.

6. A device of the type set forth comprising a plurality of compressors, means for operating the same, a former, a support for said former mounted in one of said compressors and being free to be moved independently thereof, and means for resiliently holding the former spaced from the last-named compressor.

7. In a device of the type set forth, a pair of compressors comprising jaws pivoted together and provided with operating-handles, one of said compressors being formed with a slot, lips on the inner faces of said jaws, a former, a support for the former projecting through the slot of said compressor, and a spring encircling said support and serving to hold said former from the last-named compressor.

Signed at Seattle, Washington, this 24th day of April, 1905.

LEWIS E. CAPPS.

Witnesses:
   L. C. JONASEN,
   R. W. HUNTER.